Figures 1, 2, 3, 4:
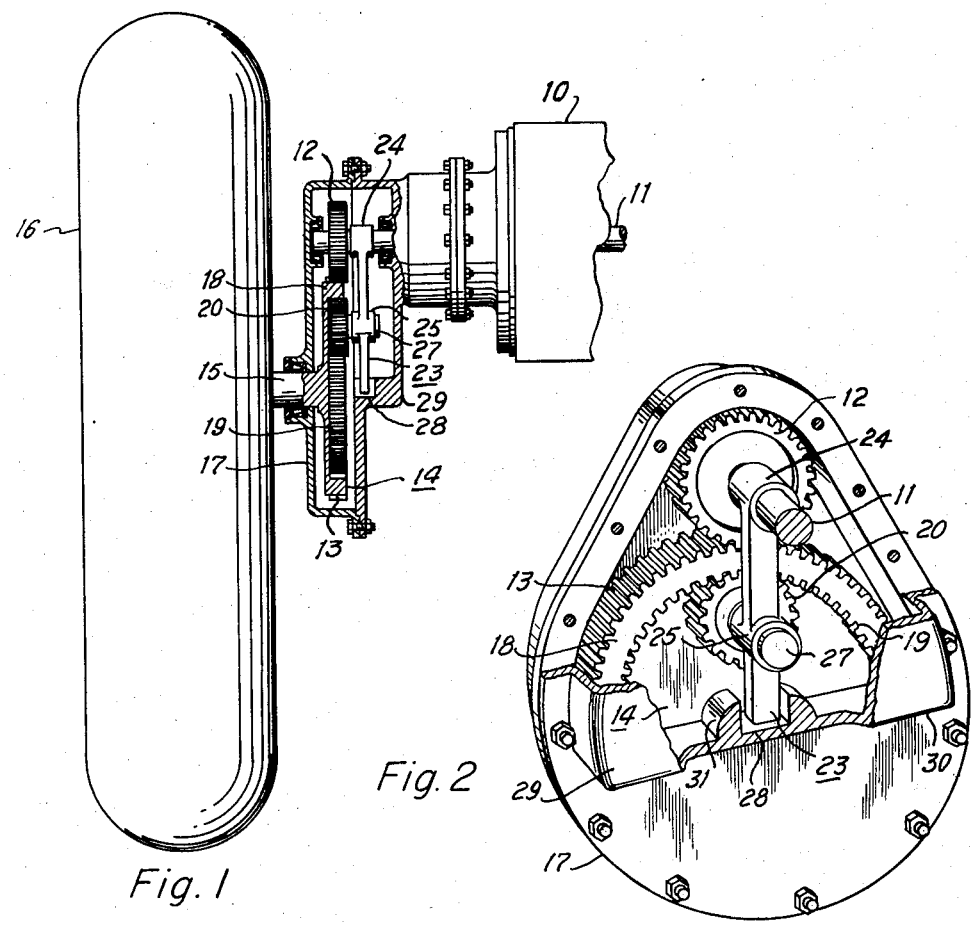

July 14, 1959     W. M. FENSTON     2,894,594

ANTI-TILT VEHICLE AXLE DRIVE

Filed Jan. 17, 1958

INVENTOR
William M. Fenston

BY Ashley & Ashley

ATTORNEYS

United States Patent Office 2,894,594
Patented July 14, 1959

2,894,594

ANTI-TILT VEHICLE AXLE DRIVE

William M. Fenston, Shreveport, La.

Application January 17, 1958, Serial No. 709,599

4 Claims. (Cl. 180—82)

This invention relates to new and useful improvements in anti-tilt axle drives for tractors and other vehicles subject to tilting.

One object of the invention is to provide an improved anti-tilt axle drive for a tractor or other vehicle subject to rearward or forward tilting which is arranged to lock the axle against relative rotation when the tractor or vehicle commences to tilt so as to stall the engine and prevent overturning.

An important object of the invention is to provide an improved anti-tilt axle drive for a tractor or other vehicle having a gear on its axle driven externally by a pinion which tends to walk around the gear when the axle ceases to turn so as to cause tilting and overturning of the tractor or vehicle, wherein said axle gear has an inner peripheral portion or concentric surface for internal engagement by coacting means which binds said gear and pinion against rotation so as to stall the engine and prevent rearing of the tractor or vehicle when the drive pinion walks around said gear.

A particular object of the invention is to provide an improved anti-tilt vehicle axle drive, of the character described, wherein the internal binding means is mounted for limited pivotal movement so as to accentuate its binding action when the drive pinion walks around the axle gear and so as to permit normal driving of said gear by said pinion.

Another object of the invention is to provide an improved anti-tilt vehicle axle drive, of the character described, wherein the internal binding means may include a spur gear for meshing with internal teeth on the inner peripheral portion of the axle gear or may be in the form of a smooth roller for frictional engagement with said peripheral portion.

A construction designed to carry out the invention will be hereinafter described, together with other features of the invention.

The invention will be more readily understood from a reading of the following specification and by reference to the accompanying drawing, wherein examples of the invention are shown, and wherein:

Fig. 1 is a rear elevational view, partly in section, of a portion of the rear wheel assembly of a tractor having an anti-tilt axle drive constructed in accordance with the invention, Fig. 2 is a perspective view, partly in section, of the anti-tilt axle drive, Fig. 3 is a side elevational view, partly in section, of the drive mounted on the tractor, and Fig. 4 is a side elevational view, partly in section, of a modified anti-tilt axle drive.

In the drawing, the numeral 10 designates the housing of the rear wheel assembly of a tractor or other similar vehicle having a drive shaft 11 and pinion 12 for meshing with the external teeth 13 of a gear 14. An axle 15, having a ground wheel 16 mounted thereon, is secured to the gear and is journaled in a suitable housing 17 which encloses said gear and drive pinion. The gear 14 is of much greater diameter than the pinion 12 and has an annular, concentric portion 18 internally of its external teeth 13. As shown in Figs. 1 and 2, the inner peripheral surface of the annular portion 18 is serrated to provide internal teeth 19 for meshing with a spur gear 20. As shown by the numeral 21 in Fig. 4, the inner peripheral surface of the annular portion 18 is smooth and unbroken for frictional engagement by a roller 22. Both the spur gear and roller function as a rotatable element for binding the gear 14, pinion 12 and drive shaft 11 against rotation so as to stall the engine of the tractor or vehicle and prevent rearward tilting and overturning of said tractor or vehicle when the pinion tends to walk rearwardly around said gear. Usually, this occurs when the wheel 16 ceases to turn and the drive shaft continues to rotate whereby the driving force causes the tractor or vehicle to rotate rearwardly about the gear of the axle.

The rotatable binding element, spur gear 20 or roller 22, is rotatably mounted and pivotally suspended by an upright hanger or member 23 which is journaled on the drive shaft 11. As shown, the hanger may be in the form of a flat bar having collars 24 and 25 at its upper end and adjacent its lower end for receiving the shaft 11 and a stub shaft 27 upon which the rotatable binding element is fixed. The hanger 23 extends below the stub shaft for engagement with a stop 28 which limits pivotal movement of said hanger and stub shaft about the axis of the drive shaft. Preferably, the stop is a part of the housing 17 which encloses the pinion 12 and gear 14 and, more specifically, an offset portion 29 of said housing. Since only limited pivotal movement of the rotatable binding element is necessary, the stop 28 is relatively close to said rotatable binding element and its stub shaft 27. As shown by the numeral 30, the offset housing portion 29 has a horizontal bottom and a pair of spaced lugs or projections 31 upstanding from the bottom for loosely confining the lower end of the hanger 23 therebetween.

Ordinarily, when the rear wheels of a tractor or similar vehicle cease to turn, the driving force of the engine causes the tractor or vehicle to tilt and overturn rearwardly. This is particularly true in the case of a tractor wherein the rear axle is driven by an offset drive shaft through a gear and pinion. The drive pinion tends to walk rearwardly around the axle gear and lift the tractor around the rear axle. The present invention overcomes this tendency in a most simple, yet unobvious manner. The rearward walking of the drive pinion around the gear is counteracted or offset by the forward walking of the rotatable element. Actually, the rotatable element binds the gear and pinion against rotation whereby the engine of the tractor is stalled to prevent rearward tilting and overturning of said tractor. The pivotal mounting of the rotatable element accentuates its binding effect and makes it function as a brake for resisting rotation of the gear. As a result, the rotatable element may be in the form of the spur gear 20 or roller 22. During normal operation, of course, the rotatable element merely rides on the inner peripheral surface of the annular portion whereby there is no interference with driving of the gear and axle by the pinion. It is noted that the novel drive is applicable to front as well as rear axles.

The foregoing description of the invention is explanatory thereof and various changes in the size, shape and materials, as well as in the details of the illustrated construction may be made, within the scope of the appended claims, without departing from the spirit of the invention.

What I claim and desire to secure by Letters Patent is:

1. An anti-tilt axle drive including a drive shaft, a pinion on the shaft, an axle, a gear on the axle having external teeth meshing with the pinion and an inner peripheral portion concentric with its external teeth, a housing surrounding the gear and pinion and having said axle and shaft journaled therein, means engaging the inner peripheral portion of said gear for binding said gear and pinion against rotation when said pinion attempts to walk around said gear, the binding means being pivotally mounted on said shaft for movement about its axis and eccentrically of the axis of rotation of said gear, and stationary means in the housing engageable by said binding means for limiting its pivotal movement.

2. An anti-tilt axle drive including a drive shaft, a pinion on the shaft, an axle, a gear on the axle having external teeth meshing with the pinion and an inner peripheral portion concentric with its external teeth, a housing surrounding the gear and pinion and having said axle and shaft journaled therein, a member pivotally mounted on said shaft for movement about its axis and eccentrically of the axis of rotation of said gear, an element supported by the member eccentrically of the axes of said axle and shaft and engaging the inner peripheral portion of said gear for binding said gear and pinion against rotation when said pinion attempts to walk around said gear, and stop means in the housing engageable by said member for limiting pivotal movement of said member.

3. An anti-tilt drive as set forth in claim 2 including internal teeth on the inner peripheral portion of the gear, the element being in the form of a rotatable spur gear meshing with the internal teeth.

4. An anti-tilt drive as set forth in claim 2 wherein the element is in the form of a roller, the roller and inner peripheral portion of the gear having smooth coacting surfaces.

References Cited in the file of this patent

UNITED STATES PATENTS

| 1,368,279 | Milutiu | Feb. 15, 1921 |
| 1,462,451 | Greasley | July 17, 1923 |
| 1,810,635 | White | June 16, 1931 |
| 2,134,687 | Dunham | Nov. 1, 1938 |

FOREIGN PATENTS

| 475,074 | Italy | Oct. 10, 1952 |